INVENTORS
ROGER M. CHRISTENSON
LOUIS R. LE BRAS

BY

ATTORNEYS

3,663,405
ULTRAFILTRATION OF ELECTRODEPOSITABLE
COMPOSITIONS
Roger M. Christenson and Louis R. Le Bras, Gibsonia,
Pa., assignors to PPG Industries, Inc., Pittsburgh, Pa.
Continuation-in-part of application Ser. No. 814,789,
Apr. 9, 1969. This application Feb. 25, 1971, Ser.
No. 118,681
Int. Cl. B01k 5/02; C23b 13/00
U.S. Cl. 204—181                                35 Claims

ABSTRACT OF THE DISCLOSURE

This invention relates to the use of a selective filtration technique such as ultrafiltration to control the composition of an electrodeposition bath comprising a solubilized synthetic organic vehicle resin.

CROSS-REFENENCES TO RELATED APPLICATIONS

This application is a continuation-in-part of application Ser. No. 814,789, filed Apr. 9, 1969, now abandoned.

Electrodeposition, while based on well-known principles, has only recently become more widely commercially accepted through the development of electrodepositable compositions which have characteristics to meet the demands placed upon a modern coating material. The coatings achieved have excellent properties for many applications and electrodeposition results in a coating which does not run or wash off during baking. Virtually any conductive substrate may be coated by electrodeposition. Most commonly employed are metal substrates, including metals such as iron, steel, copper, zinc, brass, tin, nickel, chromium and aluminum, as well as other metals and pretreated metals. Impregnated paper or other substances rendered conductive under the conditions of coating may also be used.

A major problem in a continuous electrodeposition process has been the control of the electrodeposition bath to maintain the initial paint properties. The solubilized electrodepositable vehicle resin may be characterized as a polyelectrolyte, that is, a polyacid or a polybase solubilized by a water-soluble base in the first instance and by a water-soluble acid in the second instance. When the vehicle resin is coated upon an article serving as an anode in the case of the polyacid and a cathode in the case of a polybase, there remains in solution a counter-ion, which is the base or acid used to solubilize the resin. The control or removal of excess counter-ion has been attacked by many means. These include circulating the bath through an ion-exchange resin, using a counter-ion deficient feed stock which will scavence the surplus counter-ions, circulating the bath through a dialysis unit, concentrating the counter-ion in an eletrodialysis cell formed by surrounding the electrode with a semi-permeable membrane, and the use of a vapor-liquid separation process.

While these counter-ion control means have permitted continuous bath operations, it has been seen that it remains extremely difficult to control operating tanks to retain their initial paint properties. Almost without exception, the tank never has better properties than the day it was filled and from that time on, efforts must be directed towards minimizing loss of coating properties. It has been found that as tanks operate chemicals from various sources tend to accumulate in the electrodeposition tank. The most probable sources of contamination are from chemicals on the object to be painted and water added to the tank, or chemicals absorbed from the air or from the paint itself. Regardless of the technique employed to remove counter-ions and some other objectionable ions, the deterioration of film properties have frequently occurred and, to date, no method of control has been completely satisfactory.

It has now been found that exceptional control of bath composition and removal of objectionable accumulated materials can be achieved by a selective filtration process, that is, a process which selectively removes low molecular weight materials from the bath composition. This selective filtration process removes excess counter-ion and thus serves as a method of conventional bath control; but, in addition, this method further removes other excess materials or contaminants from the bath, thus permitting more complete control over bath constituents than has heretofore been possible.

The selective filtration process is an ultrafiltration process which separates materials below a given molecular weight size from the electrodeposition bath. With properly selected membranes, this treatment does not remove any pigment or desirable resin from the paint in the tank but does remove anionic, cationic and non-ionic materials from the paint in a ratio proportional to their concentration in the water phase of the paint. Thus, for example, it is possible to remove amines, alkaline metal ions, phosphates, chromates, sulfates, solvents and dissolved carbon dioxide, among others.

The process of the invention presents, among others, the following advantages which have heretofore not been available in a single process. First, the counter-ion buildup in electrodeposition baths can be controlled. Second, water-soluble chemicals accumulating in paint of any type can be removed at any desired molecular size cutoff. Likewise, the solids content of the bath can be controlled and held at any concentration desired. In addition, this method can be used as an analytical tool to study in detail the manner in which the electrocoating tanks operate.

The technique of this invention is particularly useful in specifically controlling and specifically lowering the specific conductivity of the electrodeposition composition; removing excess solubilizing base or acid, especially above that amount necessary to theoretically neutralize the vehicle resin; removing dissolved carbon dioxide which is apparently present in base-solubilized systems as a carbonate; removing organic solvent utilized to assist in solubilizing the initial fill, as well as feed material; removing interfering ions such as chromates, phosphates, chlorides and sulfates; as well as controlling the percent solids of the bath by removal of water which may be introduced into the tank from pretreatment or post-treatment processes.

In the electrodeposition process, the articles to be electrocoated are immersed in an aqueous dispersion of a solubilized, ionized, film-forming material such as a synthetic organic vehicle resin. An electric current is passed between the article to be coated, serving as an electrode, and a counter-electrode to cause deposition of a coating of the vehicle resin on the articles. The articles are then withdrawn from the bath, usually rinsed and then the coating either air-dried or baked in the manner of a conventional finish.

A number of electrodepositable resins are known and can be employed to provide the electrodepositable compositions which may be treated by the process of this invention. Virtually any water-soluble, water-dispersible or water-emulsifiable polyacid or polybasic resinous material can be electrodeposited and, if film-forming, provides coatings which may be suitable for certain purposes. Any such electrodepositable composition is included among those which can be employed in the present invention, even though the coating obtained might not be entirely satisfactory for certain specialized uses.

Presently, the most widely used electrodeposition vehicle resins are synthetic polycarboxylic acid resinous materials. Numerous such resins are described in U.S. Pats. Nos. 3,441,489; 3,422,044; 3,403,088; 3,369,983 and 3,366,563, which are incorporated by reference. These include a reaction product or adduct of the drying oil or semi-drying oil fatty acid ester with a dicarboxylic acid or anhydride. By drying oil or semi-drying oil fatty acid esters are meant esters of fatty acids which are or can be derived from drying oils or semi-drying oils, or from such sources as tall oil. Such fatty acids are characterized by containing at least a portion of polyunsaturated fatty acids. Preferably, the drying oil or semi-drying oil per se is employed.

Also included among such esters are those in which the esters themselves are modified with other acids, including saturated, unsaturated or aromatic acids or an anhydride thereof. The acid-modified esters are made by transesterification of the ester, as by forming a di- or monoglyceride by alcoholysis, followed by esterification with the acid; they may also be obtained by reacting oil acids with a polyol and reacting the acid with the partial ester. In addition to glycerol, alcholysis can be carried out using the other polyols such as trimethylolpropane, pentaerythritol, sorbitol and the like. If desired, the esters can also be modified with monomers such as cyclopentadiene or styrene and the modified esters produced thereby can be utilized herein. Similarly, other esters of unsaturated fatty acids, for example, those prepared by the esterification of tall oil fatty acids with polyols, are also useful.

Also included within the terms "drying oil fatty acid esters" as set forth herein are alkyd resins prepared utilizing semi-drying or drying oils; esters of epoxides with such fatty acids, including esters of diglycidyl ethers of polyhydric compounds as well as other mono-, di- and polyepoxides, semi-drying or drying oil fatty acid esters of polyols, such as butanediol, trimethylolethane, trimethylolpropane, trimethylolhexane, pentaerythritol, and the like; and semi-drying or drying fatty acid esters of resinous polyols such as homopolymers or copolymers or unsaturated aliphatic alcohols, e.g., allyl alcohol or methallyl alcohol, including copolymers of such alcohols with styrene or other ethylenically unsaturated monomers or with non-oil modified alkyd resins containing free hydroxyl groups.

Any alpha,beta-ethylenically unsaturated dicarboxylic acid or anhydride can be employed to produce the reaction products described herein. These include such anhydrides as maleic anhydride, itaconic anhydride, and other similar anhydrides. Instead of the anhydride, there may also be used ethylenically unsaturated dicarboxylic acids which form anhydrides, for example, maleic acid or itaconic acid. These acids appear to function by first forming the anhydride. Fumaric acid, which does not form an anhydride, may also be utilized, although in many instances, it requires more stringent conditions than the unsaturated dicarboxylic acid anhydrides or acids which form such anhydrides. Mixtures of the above acids or anhydrides may also be utilized. Generally speaking, the anhydride or acid employed contains from 4 to 12 carbon atoms, although longer chain compounds can be used if so desired.

While the reaction products can be comprised solely of adducts of the fatty acid ester and the dicarboxylic acid or anhydride, in many instances it is desirable to incorporate into the reaction product another ethylenically unsaturated monomer. The use of such monomer often produces films and coatings which are harder and more resistant to abrasion and which may have other similar desirable characteristics.

As shown in the art, it is preferred that in certain instances the neutralization reaction be carried out in such a manner that amido groups are attached to part of the carbonyl carbon atoms derived from the dicarboxylic acid or anhydride.

Compositions within this general class are described in U.S. Pats. Nos. 3,366,563 and 3,369,983.

Another vehicle comprises the fatty acid ester, unsaturated acid or anhydride reaction products and an additional unsaturated modifying materials (as described above) which are further reacted with the polyol.

Essentially any polyol can be employed, but diols are preferred. When higher polyols, such as trimethylolpropane, glycerol, pentaerythritol and the like are utilized, they are employed in small amounts, or in conjunction with the diol, or in the presence of a monohydric alcohol, and are used with adducts having a relatively low proportion of acidic component. Water-insoluble diols are often preferable, and especially desirable water-dispersed compositions for electrodeposition are obtained using 2,2-bis(4-hydroxycyclohexyl)propane (which has given the best results), neopentyl glycol, 1,1'-isopropylidene-bis (p-phenyleneoxy)di-e-propanol, and similar diols.

The proportions of the polyol and ester-anhydride adduct which are employed depend upon various factors, but are, in general, limited only by the need to avoid gelation of the product. The total functionality of the reactants is a guide to determining the optimum proportions to be employed, and in most instances should not be greater than about 2.

In many instances, only part of the anhydride groups of the adduct, e.g., about 10 percent, are reacted with the polyol. Of those anhydride groups reacted, it is preferred that only one of the carboxyl groups is esterified in each instance.

The product contains a substantial part of the original acidity derived from the dicarboxylic acid or anhydride; ordinarily the product should have an acid number of at least about 20. To provide a water-dispersed product, such as is used in electrodeposition processes, at least part of the remaining acidic groups are neutralized by reaction of the partially-esterified product with a base.

The polyol reaction products and reaction conditions are more fully described in application Ser. No. 450,205, filed Apr. 22, 1965, now U.S. Pat. No. 3,565,781, as well as the art cited above.

Antoher type of electrodepositable coating composition which gives desirable results are the water-dispersible coating compositions comprising at least partially neutralized interpolymers of hydroxyalkyl esters of unsaturated carboxylic acids, unsaturated carboxylic acids, and at least one other ethylenically unsaturated monomer. These are employed in the composition along with an amine-aldehyde condensation product, with the interpolymer usually making from about 50 percent to about 95 percent by weight of the resinous composition.

The acid monomer of the interpolymer is usually acrylic acid or methacrylic acid, but other ethylenically unsaturated monocarboxylic and dicarboxylic acids of up to about 6 carbon atoms can also be employed. The hydroxyalkyl ester is usually hydroxyethyl or hydroxypropyl acrylate or methacrylate, but also desirable are the various hydroxyalkyl esters of the above acids having, for example, up to about 5 carbon atoms in the hydroxyalkyl radical. Mono- or diesters of the dicarboxylic acids mentioned are included. Ordinarily, the acid and ester each comprise between about one percent and about 20 percent by weight of the interpolymer, with the remainder being made up of one or more other copolymerizable ethylenically unsaturated monomers. The most often used are the alkyl acrylates, such as ethyl acrylate; the alkyl methacrylates, such as methyl methacrylate; and the vinyl aromatic hydrocarbons, such as styrene, but others can be utilized.

The above interpolymer is at least partially neutralized by reaction with a base as described above; at least about 10 percent and preferably 50 percent or more of the acidic groups are neutralized, and this can be carried out either before or after the incorporation of the interpolymer in the coating composition.

The amine-aldehyde condensation products included in these compositions are, for example, condensation products of melamine, benzoguanamine, or urea with formaldehyde, although other amine-containing amines and amides, including triazines, diazines, triazoles, guanadines, guanamines and alkyl and aryl-substituted derivatives of such compounds can be employed, as can other aldehydes, such as acetaldehyde. The alkylol groups of the products can be etherified by reaction with an alcohol and the products utilized can be water-soluble or organic solvent soluble.

Electrodeposition compositions comprising the above interpolymers and an amine-aldehyde resin are more fully described in U.S. Pat. No. 3,403,088.

Still another electrodepositable composition of desirable properties comprises an alkyd-amine vehicle, that is, a vehicle containing an alkyd resin and an amine-aldehyde resin. A number of these are known in the art and may be employed. Preferred are water-dispersible alkyds such as those in which a conventional alkyd (such as a glyceryl phthalate resin), which may be modified with drying oil fatty acids, is made with a high acid number (e.g., 50 to 70) and solubilized with ammonia or an amine, or those in which a surface-active agent, such as a polyalkylene glycol (e.g., "Carbowax"), is incorporated. High acid number alkyds are also made by employing a tricarboxylic acid, such as trimellitic acid or anhwydride, along with a polyol in making the alkyd.

The above alkyds are combined with an amine-aldehyde resin, such as those described hereinabove. Preferred are water-soluble condensation products of melamine or a similar triazine with formaldehyde with subsequent reaction with an alkanol. An example of such a product is hexakis(methoxymethyl)melamine.

The alkyd-amine compositions are dispersed in water and they ordinarily contain from about 10 percent to about 50 percent by weight of amine resin, based on the total resinous components.

Yet another electrodepositable composition of desirable properties comprises mixed esters of a resinous polyol. These resin esters comprise mixed esters of an unsaturated fatty acid adduct. Generally the polyols which are utilized with these resins are essentially any polyol having a molecular weight between about 500 and 5000. Such resinous polyols include those resinous materials containing oxirane rings which can be opened in, prior to, or during the esterification reaction to provide an apparent hydroxy site. The vehicle resins are formed by reacting a portion of the hydroxyl groups of the polyol with the fatty acid, the ratio of the reactions being such that at least an average of one hydroxyl group per molecule remains unreacted. The remaining functionality is then reacted with the unsaturated fatty acid adduct of an olefinically unsaturated dicarboxylic anhydride, such as maleic anhydride, this second esterification reaction being conducted under conditions so that esterification occurs through the anhydride ring, thereby introducing free acid groups into the molecule. Mixed acids of the class described are disclosed in Belgian Pat. No. 641,642, as well as copending application Ser. No. 568,144, filed July 27, 1966, now abandoned.

In order to produce an electrodepositable composition, it is necessary to at least partially neutralize the acid groups present with a base in order to disperse the resin in the electrodeposition bath. In organic bases such as metal hydroxides, especially potassium hydroxide, can be used. There may likewise be used ammonia or organic bases, especially water-soluble amines, such as, for example, the mono-, di- and tri-lower alkyl amines such as methylamine, ethylamine, propylamine, butylamine, dimethylamine, diethylamine, dipropylamine, dibutylamine, and m-methyl-butylamine, triethylamine, tributylamine, methyldiethylamine, dimethylbutylamine, and the like; cyclic amines such as morpholine, pyrrolidine, piperidine; diamines such as hydrazine, methyl-hydrazine, 2,3-toluene diamine, ethyl diamine and piperizine and substituted amines such as hydroxylamine, ethanolamine, diethanolamine, butanolamine, hexanolamine, and methyldiethanolamine, octanolamine, diglycolamine and other polyglycolamines, triethanolamine, and methylethanolamine, n-amino-ethanolamine and methyldiethanolamine and polyamines such as diethylene triamines.

There may be present in the electrodepositable composition any of the conventional types of pigments employed in the art. There is often incorporated into the pigment composition a dispersing or surface-active agent. Usually the pigment or surface-active agent, if any are ground together in a portion of the vehicle, or alone, to make a paste and this is blended with the vehicle to produce a coating composition.

In many instances, it is preferred to add to the bath in order to aid dispersibility, viscosity and/or film quality, a non-ionic modifier or solvent. Examples of such materials are aliphatic, naphthenic and aromatic hydrocarbons or mixtures of the same; mono- and dialkyl ethers of glycols, pine oil and other solvents compatible with the resin system. The presently preferred modifier is 4-methoxy-4-methyl-pentanone-2 (Pent-Oxone).

There may also be included in the coating composition, if desired additives such as antioxidants. For example, orthoamyl phenol or cresol. It is especially advantageous to include such antioxidants in coating compositions which are used in baths which may be exposed to atmospheric oxygen at elevated temperatures and with agitation over extended periods of time.

Other additives which may be included in coating compositions, if desired, include, for example, wetting agents such as petroleum sulfonates, sulfated fatty amines, or their amides, esters of sodium isothionates, alkyl phenoxypolyethylene alkanols, or phosphate esters including ethoxylated alkylphenol phosphates. Other additives which may be employed include anti-foaming agents, suspending agents, bactericides, and the like.

In formulating the coating composition, ordinary tap water may be employed. However, such water may contain a relatively high level of metals and cations which, while not rendering the process inoperative, these cations may result in variations of properties of the baths when used in electrodeposition. Thus, in common practice, deionized water, i.e., water from which free ions have been removed by the passage through ion exchange resins, is invariably used to make up coating compositions of the instant invention.

In addition to the electrodepositable vehicle resins described above, there may be present in the electrodepositable composition other resinous materials which are non-carboxylic acid materials. For example, as shown above, there may be added up to about 50 percent by weight of an amine-aldehyde condensation product.

Other base-solubilized polyacids which may be employed as electrodeposition vehicles include those taught in U.S. Pat. No. 3,392,165, which is incorporated herein by reference, wherein the acid groups rather than being solely polycarboxylic acid groups contain mineral acid groups such as phosphonic, sulfonic, sulfate and phosphate groups.

The process of the instant invention is equally applicable to cationic type vehicle resins, that is, polybases solubilized by means of an acid, for example, an amine-terminated polyamide or an acrylic polymer solubilized with acetic acid. Another case of such cationic polymers is described in copending application Ser. No. 772,366, filed Oct. 28, 1968, now abandoned.

In a manner similar to the anionic resins described above, the cationic resins may be formulated with adjuvants, such as pigments, solvents, surfactants, crosslinking resins, and the like.

The polyacids are anionic in nature and are dispersed or dissolved in water with alkaline materials such as amines or alkaline metal hydroxides and, when subjected to an electric current, they migrate to the anode. The polybasic resins, solubilized by acids, are cationic in character and when these resins are water-dispersed or solubilized with an acid such as acetic acid, the material deposits on the cathode under an electric current.

Ultrafiltration may be defined as a method of concentrating solute while removing solvent, or selectively removing solvent and low-molecular weight solute from a significantly higher molecular weight solute. From another aspect, it is a process of separation whereby a solution containing a solute of molecular dimensions significantly greater than the solvent is depleted of solute by being forced under a hydraulic pressure gradient to flow through a suitable membrane. The first definition is the one which most fittingly describes the term "ultrafiltration" as applied to an electrodeposition bath.

Ultrafiltration thus encompasses all membrane-moderated, pressure-activated separations wherein solvent or solvent and smaller molecules are separated from modest molecular weight macromolecules and colloids. The term "ultrafiltration" is generally broadly limited to describing separations involving solutes of molecular dimensions greater than about ten solvent molecular diameters and below the limit of resolution of the optical microscope, that is, about 0.5 micron. In the present process, water is considered the solvent.

The principles of ultrafiltration and filters are discussed in a chapter entitled "Ultrafiltration" in the spring 1968 volume of Advances in Separations and Purifications, E. S. Perry, editor, John Wiley & Sons, New York, as well as in Chemical Engineering Progress, vol. 64, December 1968, pp. 31 through 43, which are hereby incorporated by reference.

The basic ultrafiltration process is relatively simple. Solution to be ultrafiltered is confined under pressure, utilizing, for example, either a compressed gas or liquid pump in a cell, in contact with an appropriate filtration membrance supported on a porous support. Any membrane or filter having chemical integrity to the system being separated and having the desired separation characteristic may be employed. Preferably, the contents of the cell should be subjected to at least moderate agitation to avoid accumulation of the retained solute on the membrane surface with the attendant binding of the membrane. Ultrafiltrate is continually produced and collected until the retained solute concentration in the cell solution reaches the desired level, or the desired amount of solvent or solvent plus dissolved low molecular weight solute is removed. A suitable apparatus for conducting ultrafiltration is described in U.S. Pat. No. 3,494,465, which is hereby incorporated by reference.

There are two types of ultrafiltration membrane. One is the microporous ultrafilter, which is a filter in the traditional sense, that is, a rigid, highly-voided structure containing interconnected random pores of extremely small average size. Through such a structure, solvent (in the case of electrodeposition, water) flows essentially viscously under a hydraulic pressure gradient, the flow rate proportional to the pressure difference, dissolved solutes, to the extent that their hydrated molecule dimensions are smaller than the smallest pores within the structure, will pass through, little impeded by the matrix. Larger size molecules, on the other hand, will become trapped therein or upon the external surface of the membrane and will thereby be retained. Since the microporous ultrafilters are inherently susceptible to internal plugging or fouling by solute molecules whose dimensions lie within the pore size distribution of the filter, it is preferred to employ for a specific solute a microporous ultrafilter whose mean pore size is significantly smaller than the dimensions of the solute particle being retained.

In contrast, the diffusive ultrafilter is a gel membrane through which both solvent and solutes are transported by molecular diffusion under the action of a concentration or activity gradient. In such a structure, solute and solvent migration occurs via random thermal movements of molecules within and between the chain segments comprising the polymer network. Membranes prepared from highly hydrophilic polymers which swell to eliminate standard water are the most useful diffusive aqueous ultrafiltration membranes. Since a diffusive ultrafilter contains no pores in the conventional sense and since concentration within the membrane of any solute retained by the membrane is low and time-independent, such a filter is not plugged by retained solute, that is, there is no decline in solvent permeability with time at a constant pressure. This property is particularly important for a continuous concentration or separation operation. Both types of filters are known in the art.

Figure 1:
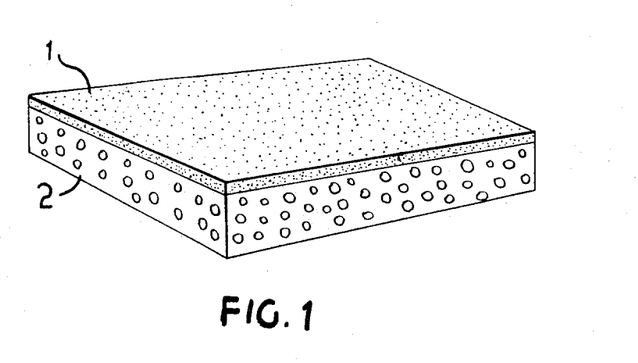

The presently preferred ultrafilter is an anisotropic membrane structure such as illustrated in FIG. 1. This structure consists of an extremely thin, about one-tenth to about ten micron layer, of a homogeneous polymer 1, supported upon a thicker layer of a microporous open-celled sponge 2, that is, a layer of about 20 microns to about 1 millimeter, although this dimension is not critical. If desired, this membrane can be further supported by a fibrous sheet, for example, paper, to provide greater strength and durability. These membranes are used with a thick film or skin side exposed to the high pressure solution. The support provided to the skin by the spongy substrate is adequate to prevent film rupture.

Membranes useful in the process are items of commerce and can be obtained by several methods. One general method is described in Belgian Pat. No. 721,058. This patent describes a process which, in summary, comprises (a) forming a casting dope of the polymer in an organic solvent, (b) forming a film of the casting dope, and (c) preferentially contacting one side of said film with a diluent having high compatibility wtih the casting dope to effect precipitation of the polymer immediately upon coating the cast film with the diluent.

The choice of a specific chemical composition for the membrane is determined to a large extent by its resistance to the chemical environment. Membranes can be typically prepared from thermoplastic polymers such as polyvinyl chloride, polyacrylonitrile, polysulfones, poly (methyl methacrylate), polycarbonates, poly(n - butyl methacrylate), as well as a large group of copolymers formed from any of the monomeric units of the above polymers, including "Polymer 360," a polysulfone copolymer. Cellulose materials such as cellulose acetate may also be employed as membrane polymers.

Some examples of specific anisotropic membranes operable in the process of the invention include: Diaflow membrane ultrafilter PM-30, the membrane chemical composition of which is a polysulfone copolymer, Polymer 360, and which has the following permeability characteristics:

[Solute retention characteristics]

| Solute | Molecular weight | Percent retention |
|---|---|---|
| Bacitracin | 1,400 | 0 |
| Cytochrome C | 14,500 | 0 |
| Pepsin | 35,000 | 100 |
| Albumin | 67,000 | 100 |
| Dextran 110 | 110,000 | 60 |

[Flow rate, ml./min.]

| Membrane diameter | Pressure, p.s.i. | Distilled water | 0.25% cytochrome C (~12,400 mw.) in distilled water | 0.25% pepsin (~35,000 mw.) in distilled water |
|---|---|---|---|---|
| 25 millimeters | 50 | 15 | 0.5 | 1.5 |
| 150 millimeters | 50 | 600 | 24.0 | 80.0 |

The membrane is chemically resistant to acids (HCl, $H_2SO_4$, $H_3PO_4$, all concentrates), alkalis, high phosphate buffer and solutions of common salts as well as concentrated urea and guanadine hydrochloride. The membrane is solvent-resistant to alcohol, acetone and dioxane. The membrane is not solvent-resistant to dimethylformamide or dimethyl sulfoxide. This membrane is hereinafter referred to as "Membrane A."

Dorr-Oliver XPA membrane, the membrane chemical composition of which is Dynel (an acrylonitrile-vinyl chloride copolymer) and which has the following permeability characteristics:

| Solute | Molecular weight | Percent retention | Flux, gal./sq. ft./day [1] |
|---|---|---|---|
| Cytochrome C | 12,600 | 50 | 100 |
| α chymotrypsinagen | 24,000 | 90 | 22 |
| Ovalbumin | 45,000 | 100 | 45 |

[1] At 30 p.s.i., 1.0% solute.

This membrane is hereinafter referred to as "Membrane B."

Dorr-Oliver BPA type membrane, the membrane chemical composition of which is phenoxy resin (polyhydroxy ether) and which has the following permeability characteristics.

Solute: Cytochrome C
   Molecular weight _____________________ 12,600
   Percent retention _____________________ 50
   Flux (gal./sq. ft./day at 30 p.s.i., 1.0% solute) _____________________ 30

This membrane is hereinafter referred to as "Membrane C."

Figure 2:
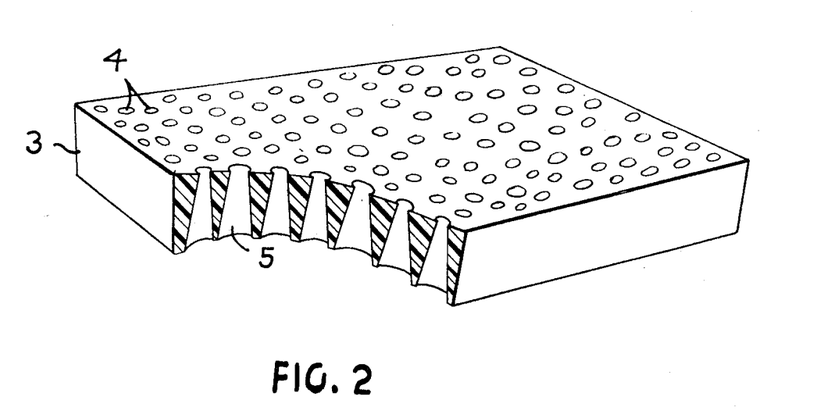

The microporous ultrafilters are generally isotropic structures, thus flow and retention properties are independent of flow direction. It is preferred to use an ultrafilter which is anisotropic in its microporous membrane structure, FIG. 2. In such a membrane, the pore size increases rapidly from one face to the other. When the fine textured side 4 is used in contact with the feed solution, this filter is less susceptible to plugging since a particle which penetrates the topmost layer cannot become trapped in the membrane because of the larger pore size 5 in the substrate.

The process of the invention may be operated as either a batch or a continuous process. In batch selective filtration or batch unltrafiltration, a finite amount of material is placed in a cell which is pressurized. A solvent and lower molecular weight solutes are passed through the membrane. Agitation is provided by a stirrer, for example, a magnetic stirrer. Obviously, this system is best used for small batches of material. In a process requiring continuous separation, a continuous selective filtration process is preferred. Using this technique, material is continuously recirculated under pressure against a membrane or series of membranes through interconnecting flow channels, for example, spiral flow channels.

Figure 3:
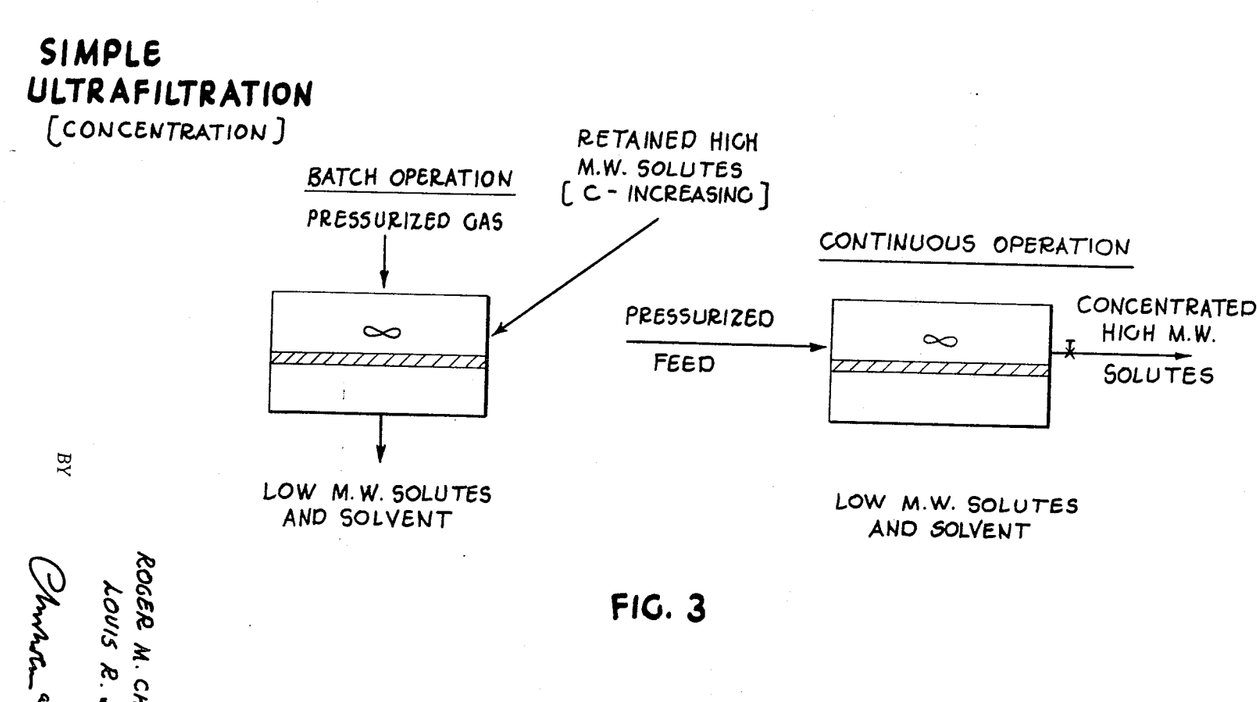
Figure 4:
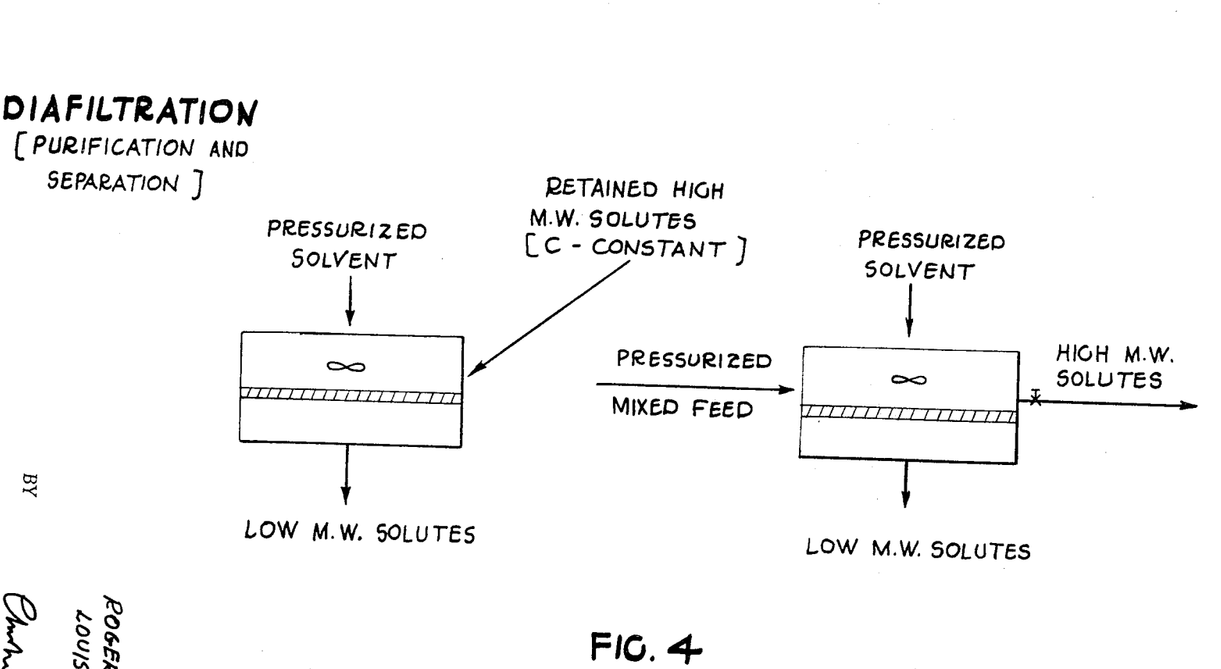

Likewise, the ultrafiltration process may be conducted as either a concentration process or a diafiltration process which are schematically shown in FIGS. 3 and 4, respectively. Concentration involves removing solvent and low molecular weight solute from an increasingly concentrated retentate. Filtration flow rate will decrease as the viscosity of the concentrate increases. Diafiltration, on the other hand, is a constant volume process whereby the starting material is connected to a reservoir of pure solvent, both of which are placed under pressure simultaneously. Once filtration begins, the pressure source is shut off in the filtration cell and, thus, as the filtrate is removed, an equal volume of new solvent is introduced into the filtration cell to maintain the pressure balance.

The configuration of the filter may vary widely and is not limiting to the operation of the process. The filter or membrane may, for example, be in the form of a sheet, tubes or hollow fiber bundles, among other configurations.

Under ideal conditions, selected low molecular weight solutes would be filtered as readily as solvent and their concentration in the filtrate is equal to that in the retentate. Thus, for example, if a material is concentrated to equal volumes of filtrate and retentate, the concentration of low molecular weight solute in each would be the same.

Using diafiltration, retentate solute concentration is not constant and the mathematical relationship is as follows:

$$\ln \frac{C_{io}}{C_i} = \frac{V_s}{V_o}$$

where $C_{io}$ is the initial solute concentration, $C_i$ is the final solute concentration of the retentate, $V_s$ is the volume of solute delivered to the cell (or the volume of the filtrate collected), and $V_o$ is the initial solution volume (which remains constant).

Electrodepositable compositions, while referred to as "solubilized," in fact are considered a complex solution, dispersion or suspension or combination of one or more of these classes in water, which acts as an electrolyte under the influence of an electric current. While, no doubt, in some circumstances the vehicle resin is in solution, it is clear that in some instances and perhaps in most the vehicle resin is a dispersion which may be called a molecular dispersion of molecular size between a colloidal suspension and a true solution.

The typical industrial electrodepositable composition also contains pigments, crosslinking resins and other adjuvants which are frequently combined with the vehicle resin in a chemical and physical relationship. For example, the pigments are usually ground in a resin medium and are thus "wetted" with the vehicle resin. As can be readily appreciated then, an electrodepositable composition is complex in terms of the freedom or availability with respect to removal of a component or in terms of the apparent molecular size of a given vehicle component.

As applied to the process of this invention, ultrafiltration comprises subjecting an electrodepositable composition, especially after it has been employed in a coating process, which inherently causes contaminants and other low molecular weight materials to accumulate in the bath, such as metal pretreatment chemicals, water, absorbed $CO_2$ (either dissolved or, more likely, combined as an aminic salt or carbonate), neutralizing agents, organic solvents and ions such as chromate, phosphate, chloride and sulfate, for example, to an ultrafiltration process employing an ultrafilter, preferably a diffusive membrane ultrafilter selected to retain the solubilized vehicle resin which passing water and low molecular weight solute, especially those with a molecular weight below about 500. As previously indicated, the filter discriminate as to molecular size rather than actual molecular weight, thus, these molecule weights merely establish an order of magnitude rather than a distinct molecular weight cut-off. Likewise, as previously indicated, the retained solutes may, in fact, be colloidal dispersions or molecular dispersions rather than true solutes.

In practice, a portion of the electrodepositable composition may be continuously or intermittently removed from the electrodeposition bath and passed under pressure created by a pressurized gas or by means of pressure applied to the contained fluid in contact with the ultrafilter. Obviously, if desired, the egress side of the filter may be maintained at a reduced pressure to create the pressure difference.

The pressures necessary are not severe. The maximum pressure, in part, depends on the strength of the filter. The minimum pressure is that pressure required to force water and low molecular weight solute through the filter at a measurable rate. With the presently preferred membranes, the operating pressures are between about 10 and 150 p.s.i., preferably between about 25 and 75 p.s.i. Under most circumstances, the ultrafilter should have an initial flux rate, measured with the composition to be treated of at least about 3 gallons/sq. ft./day (24 hours) and preferably at least about 4.5 gallons/sq. ft./day.

As previously indicated, the bath composition should be in motion at the face of the filter to prevent the retained solute from impeding the flow through the filter. This may be accomplished by mechanical stirring or by fluid flow with a force vector parallel to the filter surface.

The retained solutes comprising the vehicle resin are then returned to the electrodeposition bath. If desired, the concentrate may be reconstituted by the addition of water either before entry to the bath or by adding water directly to the bath.

If there is present in the bath desirable materials which, because of their molecular size, are removed in the ultrafiltration process, these may likewise be returned to the bath either directly to the retained solute before entry to the bath, in the makeup feed as required, or independently.

The process of the invention may be utilized as the sole means of controlling bath composition either alone or in conjunction with a composition makeup feed to replace resin depleted in the coating process. Alternatively, the process of the invention may be used as an intermittent bath cleanup process in conjunction with art-recognized control means such as component deficient or enriched makeup feeds, ion exchange, dialysis and the like.

The process of the invention is also useful for providing a total electrodeposition system which provides reduced environmental pollution. A number of process variations to achieve this result are known, for example, a closed loop system such as described in application Ser. No. 881,259, filed Dec. 1, 1969, now abandoned.

The following examples set forth specific embodiments of the instant invention. However, the invention is not to be construed as being limited to these embodiments for there are, of course, numerous possible variations and modifications. All parts and percentages in the examples, as well as throughout the specification, are by weight unless otherwise indicated.

EXAMPLE I

Phosphatized steel panels coated from this bath showed rough finishes and staining. The paint showed a high $CO_2$ content, e.g. 424 parts per million, presumably present as an amine carbonate.

This electrodeposition bath material was subjected to selective filtration utilizing a Diaflow Membrane Ultrafilter PM-30 described above as Membrane A.

The electrodepositable composition treated in this example was based upon a mixed polyol partial ester prepared as described in copending application Ser. No. 568,144, filed July 27, 1966, as well as in French Pat. No. 1,530,766. The resin comprised 45.1 percent Epon 1004 (the condensation product of epichlorohydrin and bisphenol A having an epoxy equivalent of 870 to 1025 and an average molecular weight of 1900), 31.6 percent tall oil fatty acids and 23.3 percent maleinized tall oil fatty oils. The resin was used as an 80 percent solids solution in the monoethyl ether of ethylene and glycol. The solution had a viscosity of 30,000 centipoises and an acid value of 45. The solution was designated Resin A.

The electrodepositable composition had the following initial composition:

| Component: | Parts by weight |
|---|---|
| Resin A (above) | 351.19 |
| Cresylic acid | 2.81 |
| Ethoxymethoxymethyl melamine (XM-116) | 57.54 |
| Dimethylethanolamine | 21.07 |
| Pigment— | |
| Strontium chromate | 6.78 |
| $TiO_2$ | 67.01 |
| Lead silicate | 1.36 |
| Aluminum silicate | 40.64 |
| Silica | 13.55 |
| Carbon black | 1.38 |
| Red iron oxide | 1.00 |
| Yellow iron oxide | 2.25 |
| Hydrated lemon yellow iron oxide | 1.08 |

The electrodeposition bath composition was 8.5 percent solids in deionized water.

The makeup resin for this tank was substantially similar to the above except that triethylamine was the solubilizing amine.

This tank had been in operation for three months with approximately two turnovers, utilizing amine-deficient feed to control pH. Phosphatized steel panels coated at 200 volts for two minutes at a bath temperature of 80° F. were extremely rough and stained.

The electrodeposition bath was filtered by a continuous concentration process under the following conditions:

Membrane PM-30, 150 mm. diameter
Flow channel—two interlocking spiral, 30 ml. deep
Membrane area exposed—0.1 ft.$^2$
Volume filtered $\cong$2500 cc.
Circulation rate $\cong$0.5 gal./min.
Pressure $\cong$50 p.s.i.
Filtrate rate $\cong$700 cc./hr.
Final filtrate volume $\cong$1200 cc.
Final retentate volume $\cong$1300 cc.
Time—1 hour 55 minutes

RESULTS OF FILTRATION

| | Concentration filtration | | | |
|---|---|---|---|---|
| | Original | Reconstituted [1] | Retentate | Filtrate |
| pH | 8.57 | 8.60 | 8.65 | 8.8 |
| Percent solids | 8.4 | 8.4 | 14.5 | 0.63 |
| Ash | 2.2 | 2.2 | 3.86 | |
| Conductivity (micromhos/cm.) | 2,070 | 1,810 | 2,780 | 1,730 |
| Conductivity (calculated at 10 percent solids) | 2,460 | 2,150 | 1,920 | |
| P.p.m.: | | | | |
| $CO_2$ | 424 | 195 | 337 | 503 |
| $CrO_4$ | 20 | 15 | 30 | 30 |
| $PO_4$ | <20 | <10 | <15 | <15 |
| Cl | <10 | <10 | <20 | <20 |
| $SO_4$ | 15 | 15 | 30 | <20 |
| MEQ [2]/100 grams of solid | 103.7 | 88.6 | 88.6 | 82.2 |
| MEQ/100 grams of total composition | 8.71 | 7.44 | 12.85 | 5.18 |

[1] Reconstituted retentate to original bath solids with deionized water.
[2] MEQ=Milliequivalents of amine.

CONTINUOUS CONCENTRATION BALANCE

| Composition | Grams | MEQ/100 grams of composition | P.p.m., $CO_2$ | Cellosolve (percent) |
|---|---|---|---|---|
| Retentate | 55.8 | 12.85 | 337 | 2.20 |
| Filtrate | 44.2 | 5.18 | 503 | 2.31 |
| Original | 100.0 | 8.71 | 424 | 2.50 |

NOTE:
26.3 percent amine removed.
80.0 percent free amine removed.
53.8 percent $CO_2$ removed.
45.4 percent Cellosolve removed.

Phosphatized steel panels coated at 200 volts for two minutes at a bath temperature of 80° F. had greatly reduced roughness with reduced staining.

EXAMPLE II

The concentration from the concentration filtration of Example I was reconstituted with deionized water to 8.4 percent solids and again subjected to a concentration filtration process. The reconditioned bath had a pH of 8.60 and a specific conductivity (micromhos/cm.) of 2150.

The continuous concentration ultrafiltration was conducted under the following conditions:

Membrane PM-30
Filtrate rate—144 cc./hr.
Final filtrate volume—517 ml.
Time—4 hours The concentrate was again reconstituted to 8.4 percent solids. A phosphatized steel panel coated from this twice-filtered material at 200 volts for two minutes at a bath temperature of 80° F. was of very excellent quality and staining eliminated. This reconstituted bath had a specific conductivity of 1590 mmhos.

EXAMPLE III

The vehicle resin in this example is a maleinized tall oil fatty acid-adipic acid ester of a styrene-allyl alcohol copolymer of 1100 molecular weight and 5 hydroxyl functionality (Shell X–450) comprising 39.7 percent X–450, 52.9 percent tall oil fatty acids, 1.3 percent adipic acid and 6.1 percent maleic anhydride as a 90 percent solids solution in 4-methoxy-4-methylpentanone-2 having a viscosity of 36,700 centipoises and an acid value of 38.2. The electrodeposition primer had the composition:

|  | Percent |
|---|---|
| Non-volatiles | 100 |
| Vehicle non-volatiles | 87.35 |
| Allylether of methylolated phenol (Methylon 75108) | 7.63 |
| 20% maleinized linseed oil (grinding vehicle) | 5.82 |
| Vehicle resin (above) | 85.10 |
| Surfactant (combination nonionic surfactant oil-soluble sulfonate—Witco 912) | 0.69 |
| Cresylic acid | 0.85 |
| Pigment | 12.65 |
| Red iron oxide | 17.05 |
| Anthracite coal | 57.65 |
| Bentone 11 (a montmorillonite clay modified with the trimethyl-octyl ammonium ion and containing 0.65% nitrogen) | 1.75 |
| Strontium chromate | 3.30 |
| Lead silicate | 14.52 |
| Manganese dioxide | 5.78 |

Organic solvent—4-methoxy-4-methylpentanone-2- in 20/80 ratio to vehicle resin (above).
Amine—1/4 diethyl/triethylamine.

The composition was diluted to 11 percent solids with deionized water.

|  | Initial bath Composition | Aged tank sample [1] |
|---|---|---|
| Percent solids | 11.0 | 11.0 |
| pH | 8.15 | 8.55 |
| Conductivity (mmhos./cm.) | 1,200 | 2,060 |
| MEQ/100 grams of solids | 40 | 75 |
| P.p.m. $CO_2$ | 60 | 220 |

[1] Approximately 17 months and approximately 17 turnovers.

Phosphatized steel panels coated from the aged bath showed a rough film.

The aged bath sample was subjected to a concentration ultrafiltration using the membrane described in Example I.

2000 parts of bath composition were filtered, charged and pressurized to 55 p.s.i. The filtrate rate was about 150 parts per hour, 1000 parts of filtrate were collected after seven hours.

|  | pH | Specific conductivity (mmhos./cm.) | Percent solids | P.p.m. $CO_2$ | MEQ/100 grams of solids |
|---|---|---|---|---|---|
| Original bath | 8.75 | 2,100 | 9.98 | 414 | 83.5 |
| Reconstituted bath [1] | 8.72 | 1,690 | 10.0 | 159 | 69.8 |
| Concentrate | 8.72 | 2,550 | 19.1 | 302 | 69.8 |
| Filtrate | 8.50 | 1,440 | 0.45 | 513 | 57.1 |

[1] Concentrate with filtrate volume replaced with deionixed water.

Phosphatized steel panels coated under the same conditions as the original panels (250 volts, two minutes at 75° F.) showed smooth, improved finishes.

When the concentrate was reconstituted with the filtrate, very rough irregular panels were obtained in electrodeposition.

EXAMPLE IV

The clear, electrodepositable composition treated in this example was based upon a mixed polyol partial ester prepared as described in copending application Ser. No. 568,144, filed July 27, 1966. The resin comprised 45 percent Epon 1004, 25.7 percent tall oil fatty acids and 29.3 percent maleinized tall oil fatty acids. The resin was used as an 85 percent solids solution in the methyl ether of ethylene glycol. The solution had a viscosity of 193,000 centipoises and an acid value of 62.5. The solution was designated Resin C.

The electrodepositable composition treated comprised 83 percent Resin C, 17 percent ethoxymethoxymethyl melamine (XM–1116), 100 percent theoretically neutralized with KOH at 10 percent solids in deionized water.

1000 parts of the bath composition after three cycles was subjected to concentration filtration using the PM–30 membrane described in Example I at 60 p.s.i. 525 parts of filtrate were collected in 2½ hours.

|  | pH | Specific conductivity (mmhos./cm.) | Percent solids | P.p.m. $CO_2$ | MEQ/100 grams of solids |
|---|---|---|---|---|---|
| Original bath | 9.15 | 3,800 | 8.7 | 37 | 124.0 |
| Reconstituted (with deionized water) | 8.85 | 2,850 | 8.7 | 15 | 117.0 |
| Filtrate | 8.85 | 1,750 |  |  |  |
| Concentrate | 9.05 | 5,900 |  |  | 117.0 |

EXAMPLE V

The vehicle resin in this example is a 20 percent maleic anhydride, 80 percent linseed oil-maleinized oil with a viscosity of 100,000 centipoises.

The electrodeposition bath had the following composition.

|  | Percent |
|---|---|
| Vehicle non-volatiles: | 92.6 |
| Maleinized oil | 96.75 |
| Cresylic acid | 2.88 |
| Surfactant (Witco 912) | 0.37 |
| Pigment | 7.4 |
| Carbon black | 75.5 |
| Strontium chromate | 24.5 |

Amine—diethyl amine.

The electrodeposition bath at 8 percent solids and containing 1 pound/100 gallons of 37 percent Formalin.

The electrodeposition bath had been in use for an extended period with numerous turnovers. A 1000 part portion of the electrodeposition bath was filtered as in Example I. 500 parts of filtrate were collected.

|  | pH | Specific conductivity (mmhos./cm.) | Percent solids | P.p.m., $CO_2$ |
|---|---|---|---|---|
| Original bath | 6.75 | 2,700 | 7.8 | 24 |
| Reconstituted (deionized water) | 6.77 | 2,240 | 7.8 | 17 |
| Concentrate | 6.77 | 3,310 | 14.6 | 4 |
| Filtrate | 6.88 | 2,150 | 0.6 |  |

Other electrodepositable compositions, such as those hereinabove described, can be substituted for those of the examples. Likewise, various ultrafilters and method variations may be employed to obtain the improvements hereinabove described.

As is shown, the process of the invention has many advantages over prior methods of bath control. Where component-deficient vehicle reeds have been employed, difficulties in preparation, solubilization, stability and film properties have been encountered. Systems involving ion exchange are costly and the composition tends to reduce the efficiency of the system rapidly. Dialysis is cumbersome and, like ion exchange, removes only specific ions.

Electrodeposition baths controlled with any of the conventional means, even under ideal conditions tend to show reduced performance due to materials which apparently accumulate because they are not susceptible to removal by the specific system employed. The process of the invention removes anions, cations and non-ionic materials and thus allows control heretofore unattainable. It has been demonstrated that the process will improve an electrodeposition bath which has failed to respond to conventional treatments.

According to the provisions of the patent statutes, there are described above the invention and what are now considered its best embodiments; however, within the scope of the appended claims, it is to be understood that the invention can be practiced otherwise than as specifically described.

What is claimed is:

1. A method of controlling the composition of an electrodeposition bath comprising synthetic organic vehicle resin ionically dispersed in water which comprises subjecting at least a portion of the electrodeposition bath to an ultrafiltration process wherein the ultrafiltration membrane retains vehicle resin and passes water and solute of substantially lower molecular size than the vehicle resin and returning retentate from the ultrafiltration process to the electrodeposition bath.

2. A method as in claim 1 wherein the ultrafiltration process is operated at a pressure gradient between about 10 and about 150 p.s.i., and wherein the ultrafiltration membrane has a flux rate of at least about 4.5 gallons per square foot per day.

3. A method as in claim 1 wherein the ultrafiltration membrane is an anisotropic ultrafiltration membrane.

4. A method as in claim 1 wherein the electrodeposition bath has previously been utilized to electrocoat articles.

5. A method as in claim 4 wherein the ultrafiltration process is operated at a pressure gradient between about 10 and about 150 p.s.i., and wherein the ultrafiltration membrane has a flux rate of at least about 4.5 gallons per square foot per day.

6. A method as in claim 4 wherein the electrodeposition bath contains ions deleterious to the properties of the bath and at least a portion of those ions are removed from the electrodeposition composition.

7. A method as in claim 4 wherein water is removed from the electrodeposition bath to control the solids content of the electrodepositible composition.

8. A method as in claim 4 wherein the electrodeposition bath contains, in addition to the vehicle resin, an organic solvent and where at least a portion of said organic solvent is removed from the electrodepositable composition.

9. A method as in claim 1 of controlling the composition of an electrodeposition bath comprising synthetic polyacid vehicle resin solubilized in aqueous medium with a base which comprises subjecting at least a portion of the electrodeposition bath to an ultrafiltration process wherein the ultrafiltration membrane retains vehicle resin and passes water and solute of substantially lower molecular size than the vehicle resin and returning retentate from the ultrafiltration process to the electrodeposition bath.

10. A method as in claim 9 wherein the vehicle resin is a synthetic polycarboxylic acid resin.

11. A method as in claim 10 wherein the membrane employed is an anisotropic ultrafiltration membrane.

12. A method as in claim 10 wherein the electrodeposition bath has previously been utilized to electrocoat articles.

13. A method as in claim 12 wherein at least a portion of the excess base is removed from the electrodeposition bath.

14. A method as in claim 13 wherein the base is a water-soluble amine.

15. A method as in claim 13 wherein the base is an alkali metal hydroxide.

16. A method as in claim 12 wherein at least a portion of absorbed carbon dioxide is removed from the electrodeposition bath.

17. A method as in claim 12 wherein the electrodeposition bath contains, in addition to the vehicle resin, an organic solvent and at least a portion of said organic solvent is removed from the electrodeposition bath.

18. A method as in claim 17 wherein the deleterious ions are selected from the group consisting of chromates, phosphates and sulfates.

19. A method as in claim 12 wherein the electrodeposition bath contains ions deleterious to the properties of the bath and at least a portion of those ions are removed from the electrodeposition bath.

20. A method as in claim 19 wherein the deleterious ions are metal ions.

21. A method as in claim 1 of controlling the composition of an electrodeposition bath comprising synthetic polybasic vehicle resin solubilized in aqueous medium with an acid which comprises subjecting at least a portion of the electrodeposition bath to an ultrafiltration process wherein the ultrafiltration membrane retains vehicle resin and passes water and solute of substantially lower molecular size than the vehicle resin and returning retentate from the ultrafiltration process to the electrodeposition bath.

22. A method as in claim 21 wherein the vehicle resin is an amine group-containing resin.

23. A method as in claim 21 wherein the membrane employed is an anisotropic ultrafiltration membrane.

24. A method as in claim 21 wherein the electrodeposition bath has been previously utilized to electrocoat articles.

25. A method as in claim 24 wherein at least a portion of the excess acid is removed from the electrodeposition bath.

26. A method as in claim 24 wherein the electrodeposition bath contains, in addition to the vehicle resin, an organic solvent and at least a portion of said organic solvent is removed from the electrodeposition bath.

27. A method as in claim 24 wherein the electrodeposition bath contains ions deleterious to the properties of the bath and at least a portion of those ions are removed from the electrodeposition bath.

28. In an electrodeposition process wherein an electrically-conductive object is electrocoated while serving as an electrode in an electrical circuit comprising said object and a counter-electrode in electrical contact with an aqueous electrodepositable composition comprising synthetic organic vehicle resin ionically dispersed in water, the improvement comprising subjecting at least a portion of said aqueous electrodepositable composition to an ultrafiltration process wherein the ultrafiltration membrane retains vehicle resin and passes water and solute of substantially lower molecular size than the vehicle resin, returning retentate from the ultrafiltration process to the electrodepositable composition and subsequently electrocoating an electrically-conductive object.

29. A method as in claim 28 wherein the ultrafiltration process is operated at a pressure gradient between about 10 and about 150 p.s.i., and the ultrafiltration membrane has a flux rate of at least 4.5 gallons per square foot per day.

30. A method as in claim 28 wherein the electrodepositable composition contains ions deleterious to the properties of the electrodepositable composition and at least a prtion of those ions is removed from the electrodepositable composition by said ultrafiltration process.

31. A method as in claim 28 wherein the ionically-dispersed synthetic organic vehicle resin comprises a base-solubilized synthetic polyacid resin.

32. A method as in claim 31 wherein the ultrafiltration process is operated at a pressure gradient between about 10 and about 150 p.s.i., and the ultrafiltration membrane has a flux rate of at least 4.5 gallons per square foot per day.

33. A method as in claim 32 wherein the electrodepositable composition contains ions deleterious to the properties of the electrodepositable composition and at least a portion of those ions is removed from the electrodepositable composition by said ultrafiltration process.

34. A method as in claim 28 wherein the the ionically dispersed synthetic organic vehicle resin comprises an acid-solubilized synthetic polybasic resin.

35. A method as in claim 34 wherein the ultrafiltration process is operated at a pressure gradient between about 10 and about 150 p.s.i., and the ultrafiltration membrane has a flux rate of at least 4.5 gallons per square foot per day.

References Cited

UNITED STATES PATENTS

| | | | |
|---|---|---|---|
| 3,526,588 | 9/1970 | Michaels et al. | 210—23 |
| 3,528,901 | 9/1970 | Wallace et al. | 204—181 |
| 3,556,970 | 1/1971 | Wallace et al. | 204—181 |
| 3,355,373 | 11/1967 | Brewer et al. | 204—181 |
| 3,444,066 | 5/1969 | Brewer et al. | 204—181 |
| 3,499,828 | 3/1970 | De Vittorror | 204—181 |

FOREIGN PATENTS

| | | | |
|---|---|---|---|
| 1,071,458 | 6/1967 | Great Britain | 204—181 |

HOWARD S. WILLIAMS, Primary Examiner